United States Patent [19]

Matsushita et al.

[11] Patent Number: 5,431,867
[45] Date of Patent: Jul. 11, 1995

[54] START-UP METHOD FOR CONTROLLING OUTSIDE DIAMETER OF INSULATED ELECTRIC WIRES

[75] Inventors: Keiji Matsushita, Amagasaki; Kennichi Bandoh, Ibaraki; Kiyoshi Hayashimoto, Amagasaki, all of Japan

[73] Assignee: Alpha Giken Kogyo Co., Ltd., Amagasaki, Japan

[21] Appl. No.: 216,442

[22] Filed: Mar. 23, 1994

[30] Foreign Application Priority Data

Jul. 21, 1993 [JP] Japan .............................. 5-201830
Nov. 27, 1993 [JP] Japan .............................. 5-321369

[51] Int. Cl.⁶ ...................... B29C 47/02; B29C 47/92
[52] U.S. Cl. ........................... 264/40.1; 264/39; 264/40.7; 264/174; 264/473; 425/113; 425/141
[58] Field of Search ................ 264/40.1, 39, 40.7, 264/169, 171, 174; 425/113, 114, 140, 141, 135; 364/469, 473

[56] References Cited

U.S. PATENT DOCUMENTS

| Re. 29,886 | 1/1979 | Dembiak et al. | 264/40.7 |
|---|---|---|---|
| 2,943,351 | 7/1960 | Gray | 264/174 |
| 3,032,822 | 5/1962 | Maddock | 425/113 |
| 3,504,395 | 4/1970 | MacPherson | 425/141 |
| 3,827,287 | 8/1974 | Boggs et al. | 264/40.1 |
| 3,914,357 | 10/1975 | Cereijo et al. | 264/174 |
| 4,354,989 | 10/1982 | Beach | 425/141 |
| 4,605,525 | 8/1986 | Baxter | 264/40.7 |
| 4,708,837 | 11/1987 | Baxter et al. | 425/141 |
| 4,710,114 | 12/1987 | Garner | 425/141 |
| 5,286,183 | 2/1994 | Tonsi et al. | 425/141 |

FOREIGN PATENT DOCUMENTS

62-177810  8/1987  Japan .

Primary Examiner—Mathieu D. Vargot
Attorney, Agent, or Firm—Burns, Doane, Swecker & Mathis

[57] ABSTRACT

Methods of and apparatus for controlling a startup process of a wire insulating line until a desired outside diameter of an insulated wire is obtained. A startup control apparatus according to the invention comprises an extruder for supplying an insulating material around a core conductor, a take-up device for taking up the insulated wire, a diameter measuring device for measuring an outside diameter of the insulated wire and a processor for monitoring and controlling the line startup process. In a method of controlling the startup process of the wire insulating line, the processor calculates a target speed ratio r between the extruder and take-up device, performs a first correction in which a demanded take-up speed CA' is increased by a predetermined increment ΔCA if a measured wire diameter D is equal to or greater than a target wire diameter D₀, followed by a second correction in which a demanded extruder speed EX' is increased by a predetermined increment ΔEmax only if a target extruder speed x obtained by multiplying the increased demanded take-up speed CA' by the target speed ratio r is greater than the demanded extruder speed EX'.

7 Claims, 10 Drawing Sheets

START-UP METHOD FOR CONTROLLING OUTSIDE DIAMETER OF INSULATED ELECTRIC WIRES

BACKGROUND OF THE INVENTION

1. Field of the Invention

The invention relates to the manufacture of an insulated electric wire having a uniform outside diameter in a wire insulating line where an extruder extrudes an insulating material around a core comprising at least one conductor and a take-up device takes up a finished insulated wire. More particularly, the invention relates to methods of and apparatus for controlling an outside diameter of the insulated wire during a transitional period upon every startup of the wire insulating line.

2. Description of the Prior Art

In a wire insulating line, major factors that determine the outside diameter of an insulated wire comprising at least one core conductor of a uniform diameter are extruder speed and wire take-up speed. When the extruder speed is increased or the take-up speed is reduced, the amount of insulating material supplied per unit length of the core conductor increases, resulting in an increase in the outside diameter of the finished insulated wire. Contrary to this, when the extruder speed is reduced or the take-up speed is increased, the amount of insulating material supplied per unit length of the core conductor decreases, resulting in an reduction in the outside diameter of the finished insulated wire.

In one known arrangement, a diameter measuring device continuously monitors the outside diameter of the finished insulated wire and measurement results are fed back for controlling either the extruder speed or the take-up speed so that the insulating layer is formed to a desired outside diameter.

This arrangement, however, is effective only after both the extruder and take-up device have reached steady-state running conditions. During a transitional period, or a period after the extruder and take-up device have been started up until they are stabilized enough to provide stable operation, difficulty would be found in controlling the outside diameter of the finished insulated wire. This is because optimum balance between the extruder speed and take-up speed in the transitional period is affected by a variety of factors such as operational characteristics of the extruder and take-up device, properties of the insulating material, diameter and type of the core conductor and desired thickness of the insulating layer. Particularly because the extruder has a structure in which a rotating screw pushes out a gelatinized insulating material around the core conductor, it is not certain that the actual extrusion rate is in perfect proportion with the revolving speed of a motor that drives the extruder screw. In addition, there exists a lag between the time a certain motor speed is set and the time the set motor speed is achieved, especially during the transitional period.

For reasons stated above., the startup procedure of the conventional wire insulating line usually requires a highly skilled operator. Further, the wire insulating line typically requires a considerably long time after power-on until its operation is stabilized enough to satisfy a required level of diameter tolerance, eventually causing a drop in production yield.

An approach widely employed in conventional wire insulating lines to overcome the aforementioned problem is to set a fixed target value for the ratio between the extruder speed and take-up speed based on experience. An operator manually starts and accelerates either the extruder or take-up device until a final line speed is achieved. Although this approach has proved effective to a certain extent, it is workable in rather limited conditions. Since the speed ratio is fixed in this approach, it is extremely difficult to follow or respond to varying operating conditions in a flexible manner, often leading to unsuccessful results.

Another previous approach directed to the above problem is disclosed in Japanese Patent Publication No. 62-177810, in which the diameter of the finished insulated wire is predicted from the extruder and take-up speeds measured at specified sampling intervals and the extruder speed setting is corrected based on a comparison between the predicted and measured diameters of the insulated wire. This approach is superior to the above-described approach in that the extruder speed is controlled based on the measured diameter of the insulated wire during the transitional period. According to the disclosure, however, a desired extruder speed is obtained as a function of the take-up speed and the take-up device requires manual intervention to set the rate of speed increase during the transitional period. In addition, too high a setting of acceleration of the take-up device could make it difficult for the extruder to catch up with the line speed and, therefore, a line operator is obliged to set a .rather moderate speed increase to avoid inconvenience. Consequently, the line startup time could not be much shortened and improvements in production yield and manufacturing efficiency would be negligible. Further, operation for increasing the take-up speed at an optimum rate would be extremely complicated according to this approach since a wide range of individual factors including the type of insulating material and other insulating conditions must be taken into consideration.

SUMMARY OF THE INVENTION

The present invention is directed to solve the aforementioned problems of the prior art. Accordingly, it is an object of the invention to provide methods of and apparatus for controlling an outside diameter of an insulated wire during a transitional period upon every startup of a wire insulating line applicable to a wide range of insulating requirements regardless of variations in line equipment, yet enabling fast startup of the wire insulating line.

It is another object of the invention to provide methods and apparatus that enable stable operation in controlling the outside diameter of the insulated wire during the transitional period upon startup of the wire insulating line regardless of instability of operational characteristics of the extruder.

A startup control apparatus according to the invention for controlling a startup process of a wire insulating line comprises extruder means for supplying an insulating material around a core including at least one conductor, take-up means for taking up an insulated wire, diameter measuring means for measuring an outside diameter of the insulated wire, means for comparing a measured outside diameter D of the insulated wire with a target outside diameter $D_0$, means for increasing a take-up speed of the take-up means by a specified amount if the measured outside diameter D of the insulated wire is equal to or greater than the target outside diameter $D_0$, means for increasing an extruder speed of the extruder means by a specified amount if the measured outside diameter D of the insulated wire is less than the target outside diameter $D_0$, and means for judging that the extruder speed of the extruder means or the take-up speed of the take-up means, whichever preselected, has reached a set final speed.

Upon startup of the wire insulating line, the startup control apparatus accelerates the extruder means and take-up means until the target outside diameter $D_0$ is obtained while controlling the process of acceleration based on the measured outside diameter D of the insulated wire. The startup control apparatus achieves quick startup of the wire insulating line by increasing the line speed without decelerating either the extruder or take-up means.

These and other objects, features and advantages of the present invention will become more apparent after having read the following detailed disclosure of the preferred embodiments with reference to the appended drawings.

BRIEF DESCRIPTION OF THE DRAWINGS

FIGS. 6(1)–6(2) are flowcharts showing "EX-Adjust" and "CA-Adjust" subroutines to be called from the master routine of FIGS. 4 and 5, respectively;

DETAILED DESCRIPTION OF THE PREFERRED EMBODIMENTS OF THE INVENTION

The invention will now be described by way of preferred embodiments with reference to the accompanying drawings.

Figure 1:
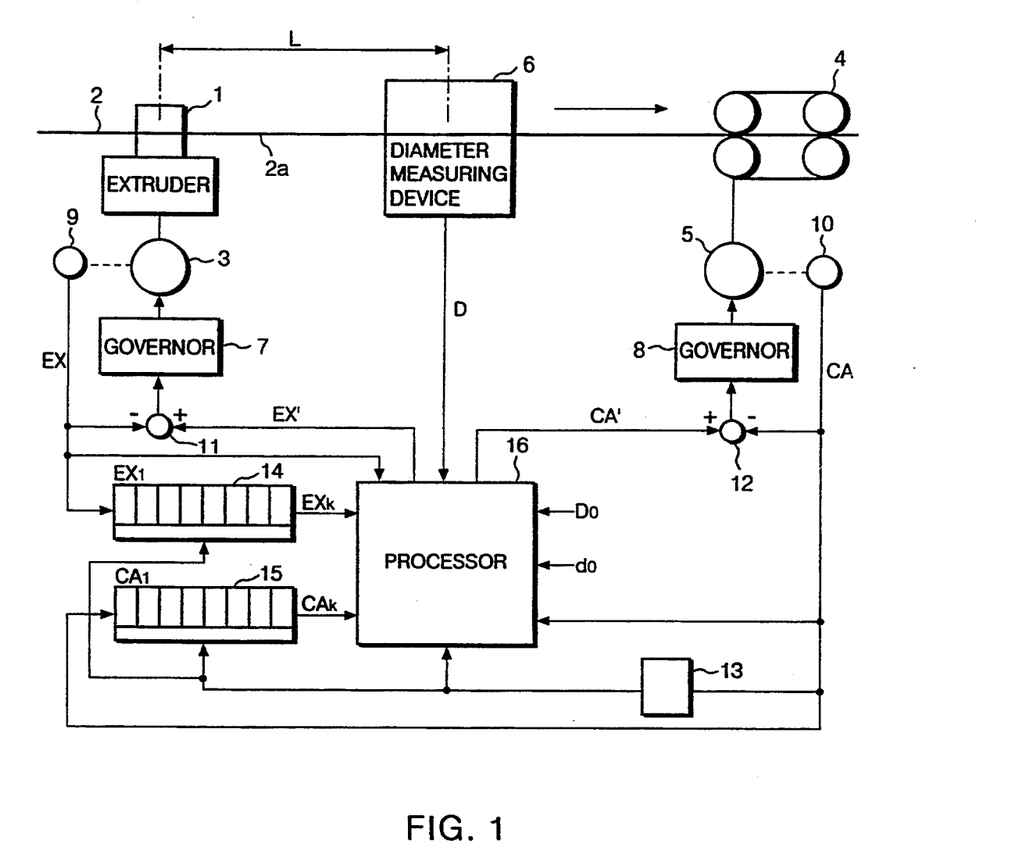
FIG. 1 is a block diagram of a startup control apparatus for controlling an outside diameter of an insulated wire in a wire insulating line according to a first embodiment of the invention.

FIG. 1 is a block diagram of a startup control apparatus for controlling an outside diameter of an insulated wire in a wire insulating line according to a first embodiment of the invention.

Although the apparatus shown in FIG. 1 is used for controlling the outside diameter of the insulated wire even in steady-state running conditions of the wire insulating line, the following description focuses on its configuration and operation in relation to a startup control process of the wire insulating line.

Referring to FIG. 1, indicated by the numeral 1 is an extruder for feeding an insulating material around a core conductor 2. More particularly, the extruder 1 gelatinizes pellets of raw insulating material like vinyl resin supplied from a hopper and extrudes the gelatinized insulating material around the core conductor 2 by means of a screw driven by a motor 3 to form an insulated wire $2a$. Indicated by the numeral 4 is a take-up device driven by another motor 5 for taking up the insulated wire $2a$ coming out from a crosshead of the extruder 1 in the direction shown by an arrow in FIG. 1. Indicated by the numeral 6 is a diameter measuring device for measuring the diameter of the insulated wire $2a$. The diameter measuring device 6 is provided at a place separated by a distance L from the extruder 1 as it is usually difficult to measure the diameter of the insulated wire $2a$ at the outlet of the extruder 1. Indicated by the numerals 7 and 8 are governors for controlling the revolving speeds of the motors 3 and 5 in accordance with respective speed settings. Indicated by the numerals 9 and 10 are speed sensors for measuring and outputting extruder speed EX of the extruder 1 and take-up speed CA of the take-up device 4, respectively. In this embodiment, it is assumed that the amount of insulating material extruded by the extruder 1 per unit time is in exact proportion with the revolving speed of the extruder screw. On this assumption, the extruder speed EX is expressed by the revolving speed of the motor 3 that drives the extruder screw. Likewise, it is assumed that the actual take-up speed of the take-up device 4 is in exact proportion with the revolving speed of the motor 5, and the take-up speed CA is expressed by the revolving speed of the motor 5.

Indicated by the numeral 11 is a subtracter which calculates the difference between the measured extruder speed EX and demanded extruder speed EX' fed from a later-described processor 16 and outputs a resultant speed difference signal to the governor 7. Indicated by the numeral 12 is another subtracter which calculates the difference between the measured take-up speed CA and demanded take-up speed CA' fed from the processor 16 and outputs a resultant speed difference signal to the governor 8.

Indicated by the numeral 13 is a pulse generator which integrates a take-up speed (CA) signal and generates a pulse each time the take-up device 4 takes up a predetermined length of the insulated wire $2a$. This length is set to a value obtained by dividing the distance L between the extruder 1 and diameter measuring device 6 by a certain integer k. Indicated by the numerals 14 and 15 are shift registers for storing, respectively, the extruder speed EX and take-up speed CA as they are sampled each time a pulse is inputted from the pulse generator 13. Specifically, the shift register 14 stores a value $EX_1$ of the extruder speed EX while the shift register 15 stores a value $CA_1$ of the take-up speed CA every sampling cycle. As each successive pulse is entered, the shift registers 14 and 15 shift the stored data from one storage location to the next and finally output the data as variables $EX_k$ and $CA_k$, respectively, to the processor 16. Thus, $EX_k$ and $CA_k$ express values of the extruder speed. EX and take-up speed CA detected when that portion of the insulated wire $2a$ of which diameter D is currently measured by the diameter measuring device 6 was actually located at the outlet of the extruder 1.

The processor 16 comprises a read-only-memory (ROM) for storing a program and permanent data and a random-access-memory (RAM) for temporary data storage and data processing. The processor 16 receives such data as extruder speed EX from the speed sensor 9, take-up speed CA from the speed sensor 10, extruder speed $EX_k$ from the shift register 14, take-up speed $CA_k$ from the shift register 15, measured diameter D of the insulated wire 2a from the diameter measuring device 6, trigger pulses from the pulse generator 13, as well as target diameter $D_0$ of the insulated wire 2a and diameter $d_0$ of the core conductor 2 entered through data input means. Then, the processor 16 performs arithmetic operations using these inputs and sends out demanded extruder speed EX' and demanded take-up speed CA'. Referring now to the flowcharts of FIGS. 2 to 6, the process of controlling the outside diameter of the insulated wire 2a upon startup of the wire insulating line is described in detail focusing on the operational sequence of the processor 16 which constitutes a main part of the startup control apparatus.

Figure 2:
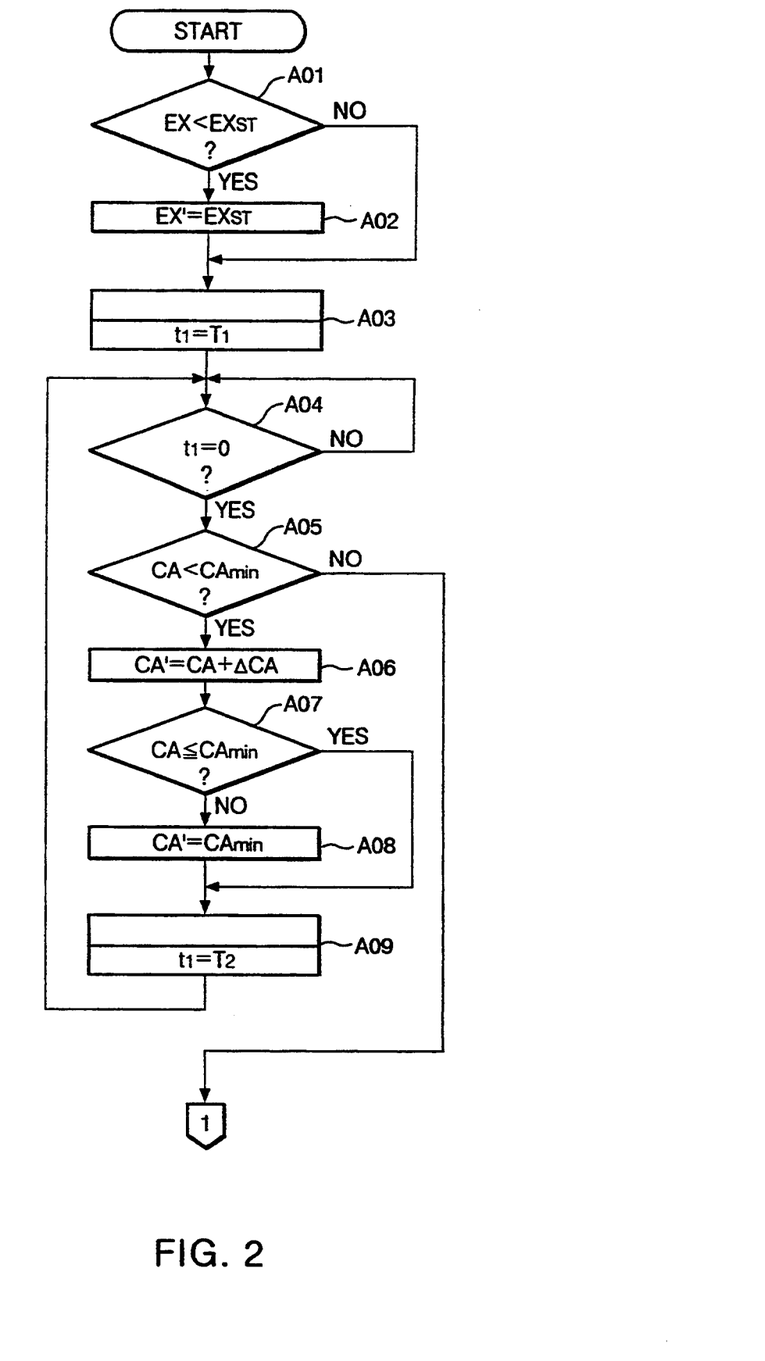
FIG. 2 is a flowchart showing a first part of preparatory operations to be performed by the apparatus of the first embodiment.

FIG. 2 is a flowchart showing a first part of preparatory operations to be performed in a very initial stage of the startup control process. After starting up the motor 3 of the extruder 1 and the motor 5 of the take-up device 4, the processor 16 judges in step A01 whether the measured extruder speed EX is below an extruder startup speed $EX_{ST}$ at which the extruder 1 can extrude the insulating material at a specified minimum rate. If the extruder speed EX is below $EX_{ST}$ (YES in step A01), the processor 16 sets the demanded extruder speed EX' to $EX_{ST}$ in step A02 and a transient state is stabilized within a period $T_1$ set on a countdowntimer in step A03. Here, the period $T_1$ is a waiting time taken before proceeding to further steps.

When the timer has completed the countdown process (YES in step A04), it is judged in step A05 whether the measured take-up speed CA is below a minimum take-up speed $CA_{min}$ needed for initiating a full-scale startup control process. If the take-up speed CA is equal to or greater than $CA_{min}$ (NO in step A05), the operation flow proceeds to step A10 in the flowchart of FIG. 3. Contrarily, if the take-up speed CA is below $CA_{min}$ (YES in step A05), the demanded take-up speed CA' is set to a value increased by an increment $\Delta CA$ from the take-up speed CA in step A06. After increasing the take-up speed, the processor 16 judges in step A07 whether the take-up speed CA is equal to or less than the minimum take-up speed $CA_{min}$. If the judgment result is in the affirmative (YES in step A07), the operation flow proceeds to step A09. After a waiting time $T_2$ set for stabilization of a transient state caused by the take-up speed increment $\Delta CA$ has elapsed (steps A09 and A04), the processor 16 re-executes the sequence from step A05. On the other hand, if the take-up speed CA is above $CA_{min}$ (NO in step A07), the processor 16 sets the demanded take-up speed CA' to the minimum take-up speed $CA_{min}$ (step A08) and waits until the set stabilization waiting time $T_2$ elapses (steps A09 and A04 ). Such an arrangement is made to prevent irregular formation of an insulating layer which could be caused by excessive acceleration from the initial low-speed state. Whichever operation flow the processor 16 may take in the flowchart of FIG. 2, the take-up speed CA reaches or exceeds the minimum take-up speed $CA_{min}$ (NO in step A05) in the course of time and the processor 16 proceeds to step A10 of FIG. 3.

The aforementioned minimum speeds $EX_{ST}$ and $CA_{min}$ are typically set within a range of 2 to 10% of finally set extruder and take-up speeds, respectively. Also, the waiting times $T_1$ and $T_2$ to be counted by the countdowntimer are typically set within a range of 1 to 2 seconds (steps A03 and A09). Further, the take-up speed increment $\Delta CA$ is set to 0.5 to 1% of the finally set take-up speed, for example.

Figure 3:
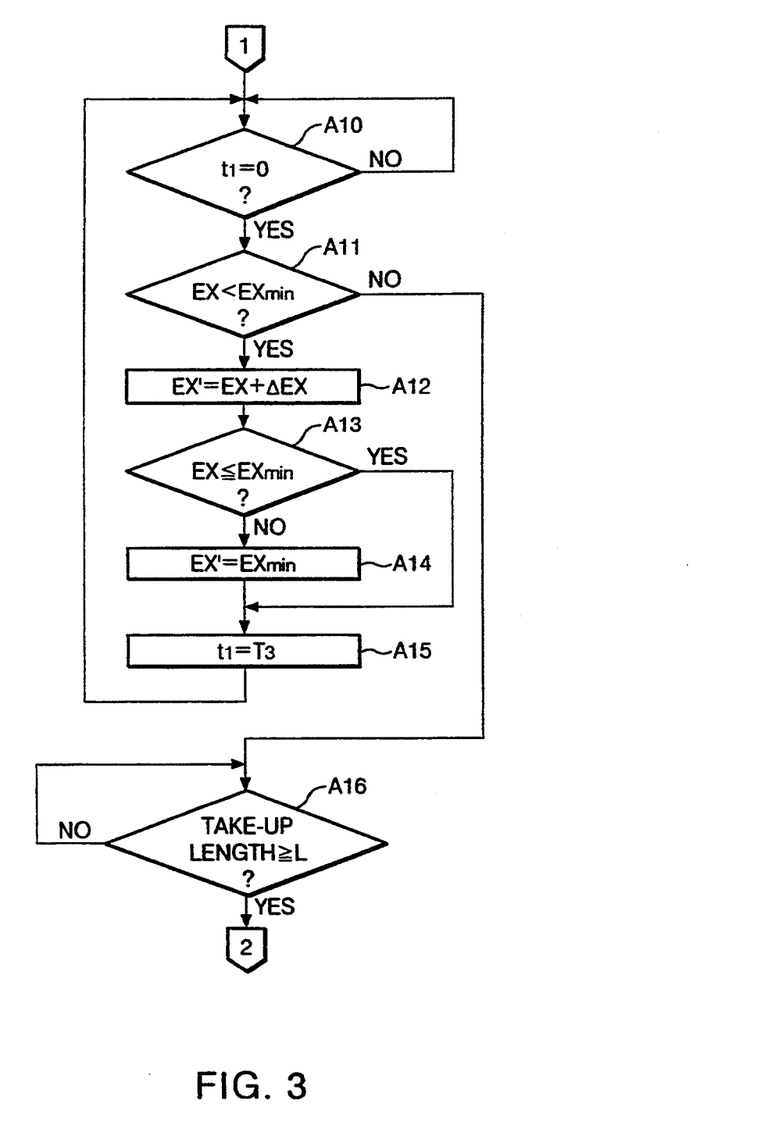
FIG. 3 is a flowchart showing a second part of preparatory operations to be performed by the apparatus of the first embodiment.

FIG. 3 is a flowchart showing a second part of preparatory operations to be performed following the operation flow of FIG. 2. Since the countdown process of the countdowntimer is already completed (i.e., t1=0) in FIG. 1, the processor 16 passes through step A10 and proceeds to step A11, where it is judged whether the extruder speed EX is below a minimum extruder speed $EX_{min}$. Here, the value $EX_{min}$ gives an extruder speed at which the extruder 1 can supply a minimum amount of insulating material per unit time that is essential for securing sure adhesion of the insulating material to the core conductor 2. The minimum extruder speed $EX_{min}$ can vary depending on such factors as the diameter of the core conductor 2 and the type of the insulating material, and is absolutely needed for successful startup control as is the minimum take-up speed $CA_{min}$.

If the extruder speed EX is equal to or greater than $EX_{min}$ (NO in step A11), the operation flow proceeds to step A16, where it is judged whether the length of the insulated wire 2a taken up from the beginning has reached or exceeded the distance L between the extruder 1 and diameter measuring device 6. If the judgment result in step A16 is in the affirmative, the operation flow further proceeds to step B01 in the flowchart of FIG. 4. On the other hand, if the extruder speed EX is below $EX_{min}$ (YES in step A11), the demanded extruder speed EX' is set to a value increased by an increment $\Delta EX$ from the extruder speed EX in step A12. After increasing the extruder speed, the processor 16 judges in step A13 whether the extruder speed EX is equal to or less than the minimum extruder speed $EX_{min}$. If the judgment result is in the affirmative (YES in step A13), the operation flow proceeds to step A15. After a waiting time $T_3$ set for stabilization of a transient state caused by the extruder speed increment $\Delta EX$ has elapsed (steps A15 and A10), the processor 16 re-executes the sequence from step A11. On the other hand, if the extruder speed EX is above $EX_{min}$ (NO in step A13), the processor 16 sets the demanded extruder speed EX' to the minimum extruder speed $EX_{min}$ (step A14) and waits until the set stabilization waiting time $T_3$ elapses (steps A15 and A10). Similar to already described step A08, the above arrangement is intended to prevent irregular formation of an insulating layer which could be caused by excessive acceleration from the initial low-speed state. When the extruder speed EX has eventually reached or exceeded the minimum extruder speed $EX_{min}$ (NO in step A11), the processor 16 proceeds to step B01 of FIG. 4 after checking the length of the insulated wire 2a already taken up by the take-up device 4 in step A16.

Figure 4:
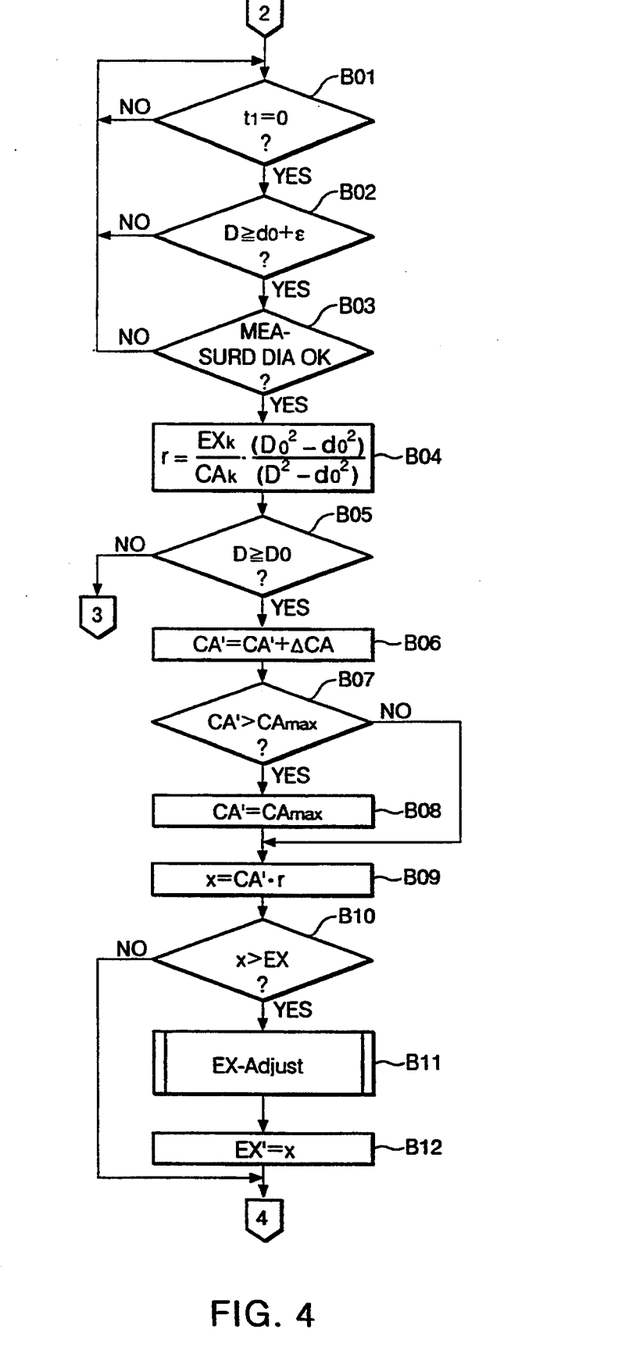
FIG. 4 is a flowchart that follows FIG. 3 showing startup control operations to be performed by the apparatus of the first embodiment.
Figure 5:
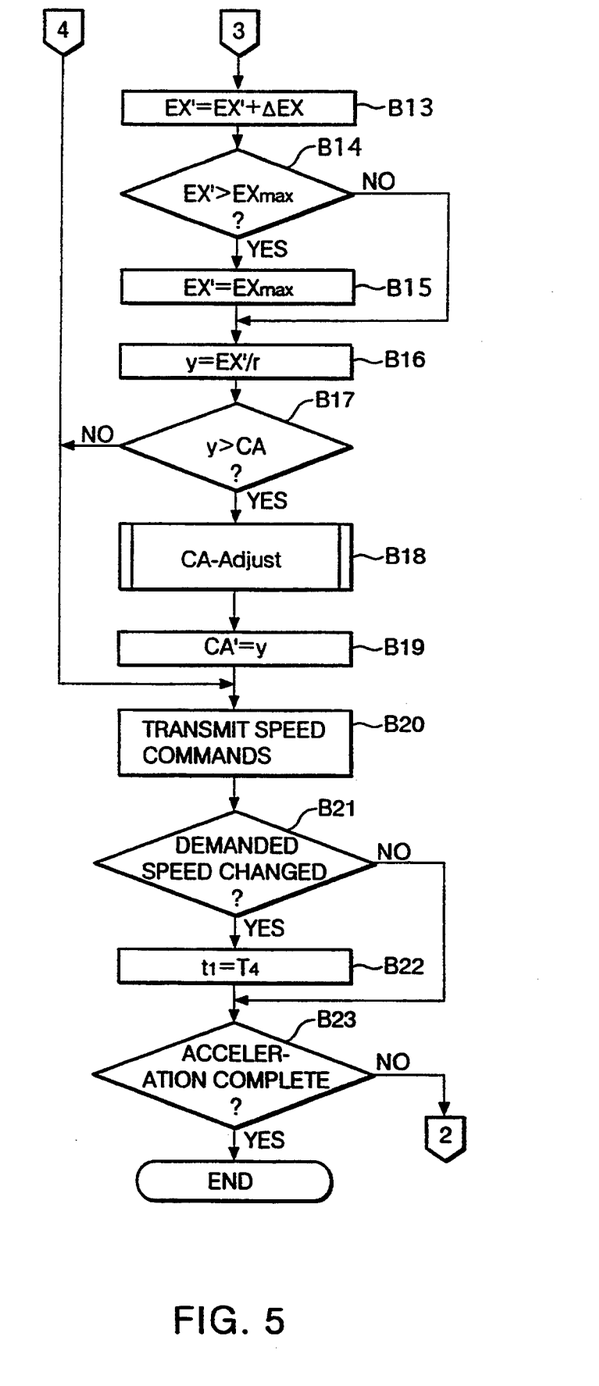
FIG. 5 is a flowchart that follows FIG. 4 showing startup control operations to be performed by the apparatus of the first embodiment.
Figure 6:
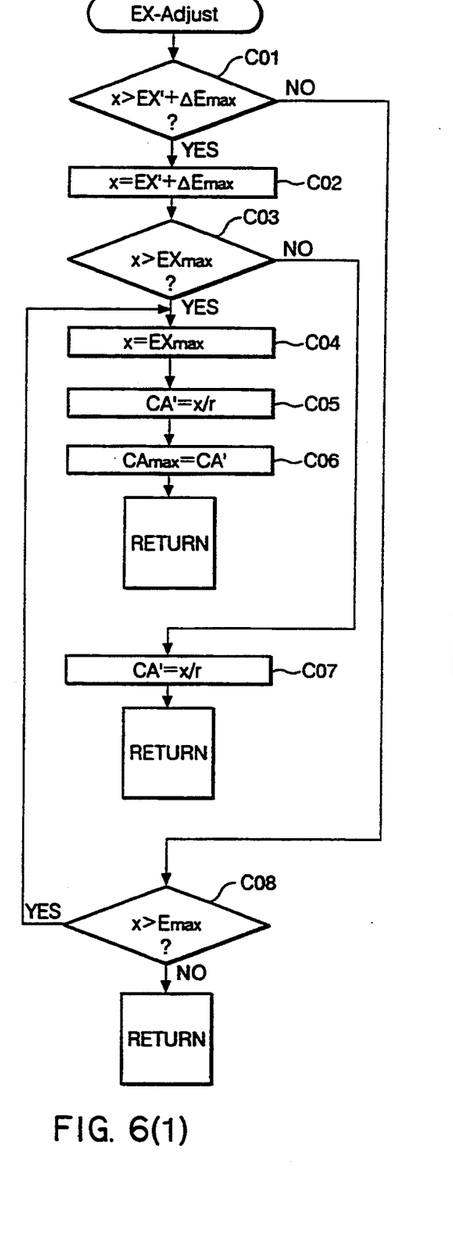

So far described are preparatory operations and now the apparatus performs full-scale startup control operations which are illustrated in FIGS. 4 through 6. Steps B01 (FIG. 4) through B19 (FIG. 5) describe a sequence in which the processor 16 calculates one each value of demanded extruder speed EX' and demanded take-up speed CA'. A detailed description of this sequence is given below in a step-by-step manner.

Referring to FIG. 4, the processor 16 directly proceeds from step B01 to B02. Step B02 is to determine whether the insulating layer is formed around the core conductor 2 in a well stable manner. Specifically, the processor 16 judges whether the difference between the measured wire diameter D and the core conductor diameter $d_0$ is equal to or greater than a predetermined value $\epsilon$ which ensures proper formation of the insulating layer. The diameter measuring device 6 typically has a resolution of 0.001 mm and the value $\epsilon$ for step B02 is set to around 0.1 mm, for example.

In step B03, it is judged whether the measured wire diameter D is reliable. Specifically, reliability of each measurement is evaluated with reference to other measurements taken at several sampling points on the insulated wire 2a to eliminate the influence of extraneous noise or other unwanted error factors; for example, an erratic measurement taken at an isolated hump formed on the surface of the insulation would be ruled out in step B03.

If it is judged that the measurement is reliable (YES in step B03), data including extruder speed $EX_k$ from the shift register 14, take-up speed $CA_k$ from the shift register 15, measured diameter D of the insulated wire 2a from the diameter measuring device 6, target diameter $D_0$ of the insulated wire 2a and diameter $d_0$ of the core conductor 2 are entered into the processor 16. Then, the processor 16 calculates a target speed ratio r using the following equation (step B04):

$$r = \frac{EX_k}{CA_k} \cdot \frac{(D_0^2 - d_0^2)}{(D^2 - d_0^2)} \quad (1)$$

The target speed ratio r obtained from the above equation gives the ratio of the demanded extruder speed EX' to the demanded take-up speed CA' (i.e., EX'/CA') to be achieved in order to bring the wire diameter D, which was measured when the extruder to take-up speed ratio was $EX_k/CA_k$, up to the target wire diameter $D_0$.

Provided that the insulated wire 2a and core conductor 2 have circular cross-sections of outside diameters D and $d_0$, respectively, cross-sectional area S of the insulating layer (excluding the core conductor 2) is given by $$S = \frac{\pi(D^2 - d_0^2)}{4} \quad (2)$$

Provided that the actual extrusion rate of the extruder 1 is W mm$^3$/min. and the actual speed of the wire 2a pulled by the take-up device 4 is V m/min., the cross-sectional area S of the insulating layer is proportional to the ratio W/V.

As previously mentioned, the discussion herein is based on the assumption that the extrusion rate W is proportional to the extruder speed EX and the wire speed V is proportional to the take-up speed CA. Accordingly, the sectional area S of the insulating layer, or $(D^2 - d_0^2)$, is proportional to the extruder to take-up speed ratio EX/CA. Thus, there is a relationship expressed by the following equation between the extruder to take-up speed ratio $EX_k/CA_k$ obtained when the measured wire diameter was D and the target speed ratio r to be achieved to bring the wire diameter up to $D_0$:

$$r:(D_0^2 - d_0^2) = (EX_k/CA_k):(D^2 - d_0^2) \quad (3)$$

Equation (1,) which is used in step B04 for calculating the target speed ratio r is derived from equation (3) above.

Next, it is judged in step B05 whether the measured wire diameter D is equal to or greater than the target wire diameter $D_0$, that is, $D \geq D_0$ which is identical to $EX_k/CA_k \geq r$. If the inequality $D \geq D_0$ is satisfied, or the measured wire diameter D is equal to or greater than the target wire diameter $D_0$ (YES in step B05), the take-up speed CA is increased to lower the extruder to take-up speed ratio. More particularly, if $D \geq D_0$, the processor 16 performs a first correction in which the demanded take-up speed CA' is increased by an increment $\Delta CA$ (step B06). At this point, if the increased value of the demanded take-up speed CA' exceeds a predetermined final take-up speed $CA_{max}$ (YES in step B07), the demanded take-up speed CA' is set to $CA_{max}$ (step B08).

In steps B09 through B12, the processor 16 examines the effect of the above-described correction, in which the demanded take-up speed CA' was adjusted based on the measured wire diameter D, with reference to the target speed ratio r. Specifically, the corrected value of the demanded take-up speed CA' is multiplied by the target speed ratio r to obtain a target extruder speed x (step B09) and it is judged whether the target extruder speed x is greater than the measured extruder speed EX (step B10). If the judgment result is in the affirmative (i.e., x>EX), the processor 16 performs a second correction in which the demanded extruder speed EX' is increased by a specified amount (steps B11 and B12). On the contrary, if the target extruder speed x is equal to or less than the measured extruder speed EX (NO in step B10), no adjustment is made to reduce the demanded extruder speed EX'. In the latter case, the extruder to take-up speed ratio $EX_k/CA_k$ is corrected by increasing the demanded take-up speed CA' as will be described later.

As seen above, the startup control process performed by the apparatus of the present invention involves the above-described first and second corrections, in which the extruder speed EX and/or take-up speed CA is always increased, and not decreased, for achieving quick startup of the wire insulating line.

In step B11, the processor 16 performs a subroutine designated "EX-Adjust" of which details are now described referring to the flowchart of FIG. 6(1). As already described, the demanded extruder speed EX' is increased to correct the extruder to take-up speed ratio $EX_k/CA_k$. First, the processor adds an increment $\Delta E_{max}$, which is usually set to about 1% of the finally set extruder speed, to the demanded extruder speed EX' and compares the increased value of the demanded extruder speed EX'+$\Delta E_{max}$ with the target extruder speed x in step C01. If the value EX'+$\Delta E_{max}$ is equal to or greater than the target extruder speed x (NO in step C01), the operation flow returns to step B11 of FIG. 4 via step C08. Then, the demanded extruder speed EX' is set to the target extruder speed x (i.e., EX'=x) and correction of the demanded extruder speed is once finished (step B12).

Returning to FIG. 6 (1), if the value EX°+$\Delta E_{max}$ is less than the target extruder speed x (YES in step C01), the target extruder speed x is set to $EX'+\Delta E_{max}$ in step C02. In this case, the demanded take-up speed CA' is corrected again using the target speed ratio r (step C07) and the operation flow returns to steps B11 and B12 of FIG. 4.

Described above are operations to be performed when the target extruder speed x is equal to or less than a predetermined final extruder speed $EX_{max}$ (i.e., $x \leq EX_{max}$). If the target extruder speed x exceeds the value $EX_{max}$ (YES in step C03 or C08), the target extruder speed x is set to the final extruder speed $EX_{max}$ (step C04). Then, the demanded take-up speed CA' is corrected again using the target speed ratio r in the same manner as step C07 (step C05) and the value $CA_{max}$ is overwritten by the corrected value of the demanded take-up speed CA' to prevent a further increase in the take-up speed (step C06).

Returning to step B05 of FIG. 4, if it is judged that the measured wire diameter D is less than the target wire diameter $D_0$ (i.e., $D<D_0$), the operation flow proceeds to step B13 and onward of FIG. 5, where the demanded extruder speed EX' is increased. Specifically, the processor 16 performs a first correction in which the demanded extruder speed EX' is increased by an increment $\Delta EX$ (step B13). At this point, if the increased value of the demanded extruder speed EX' exceeds the final extruder speed $EX_{max}$ (YES in step B14), the demanded extruder speed EX' is set to $EX_{max}$ (step B15).

In steps B16 through B19, the processor 16 examines the effect of the above-described correction, in which the demanded extruder speed EX' was adjusted based on the measured wire diameter D, with reference to the target speed ratio r. Detailed explanation of steps B16 through B19 is omitted because these steps proceed in substantially the same manner as the already described steps B09 through B12 except that steps B16–B19 are to adjust the wire take-up speed instead of the extruder speed. Step B18 is a subroutine designated "CA-Adjust" of which operational sequence is illustrated in FIG. 6(2).

Starting from step C09, an operation flow of the "CA-Adjust" subroutine of FIG. 6(2) takes steps C10, C11, C12 and C13 in sequence, and returns to FIG. 5 without overwriting the final extruder speed $EX_{max}$ with the corrected value of the demanded extruder speed EX' (i.e., $EX_{max} \leftarrow EX'$). In other words, the "CA-Adjust" subroutine does not include a step corresponding to step C06 of the "EX-Adjust" subroutine illustrated in FIG. 6(1). This is because the judgment (step B23 of FIG. 5) as to whether the startup control process (or an overall line acceleration process) has been completed is made based on whether the take-up speed CA has reached or exceeded the final take-up speed $CA_{max}$ in this embodiment.

Whichever route is taken in the operation flow from step B01 of FIG. 4 and onward, the processor 16 calculates the target speed ratio r by using the measured wire diameter D, determines the demanded extruder speed EX' and demanded take-up speed CA' and eventually arrives at step B20 of FIG. 5. At this point, the demanded extruder speed EX' and demanded take-up speed CA' are transmitted from the processor 16 to the subtracter 11 and subtracter 12, respectively, and overwrite previous commands. As a result, the governor 7 adjusts the revolving speed of the extruder motor 3 so that the extruder speed EX coincides with the demanded extruder speed EX'. Similarly, the governor 8 adjusts the revolving speed of the take-up motor 5 so that the take-up speed CA coincides with the demanded take-up speed CA'.

Further, the processor 16 compares the current and previous values of the demanded extruder speed EX' and demanded take-up speed CA' in step B21. If the current and previous values of both the demanded extruder speed EX' and demanded take-up speed CA' are same (NO in step B21), the processor 16 proceeds to step B23 where a judgment is made as to whether the acceleration process has been completed. Specifically, the processor 16 judges whether the take-up speed CA has reached or exceeded the final take-up speed $CA_{max}$.

On the other hand, if the current and previous values of either or both of the demanded extruder speed EX' and demanded take-up speed CA' are different (YES in step B21), the processor 16 sets a waiting time $T_4$ needed for stabilization of a transient state on the countdown timer and proceeds to step B23. When the take-up speed CA has reached or exceeded the final take-up speed $CA_{max}$ (YES in step B23), the startup control process is finished and the processor 16 switches the apparatus to a steady-state running mode. If the take-up speed CA is less than $CA_{max}$ (NO in step B23), the operation flow returns to step B01 of FIG. 4. Then, a measured wire diameter D is entered to the processor 16 and the processor 16 calculates a target speed ratio r and re-executes the procedure of step B05 and onward.

The apparatus of the above-described preferred embodiment employs the shift registers 14 and 15 for storing measured values of extruder speed EX and take-up speed CA, respectively. In one variation of the invention, the processor 16 may comprise a memory having a queue structure for storing incoming measurement data on a first-in-first-out (FIFO) basis. A startup control apparatus thus modified would provide high-speed data processing and eventually faster execution of the startup control process.

Of course, such sample-and-hold means would not be required at all if the apparatus is modified in such a manner that the outside diameter of the insulated wire 2a is measured directly at the outlet of the extruder 1.

Also, the apparatus of the above-described preferred embodiment judges that the startup control process has been completed when the take-up speed CA has reached or exceeded the final take-up speed $CA_{max}$ (step B23). In another variation of the invention, the judgment may be made based on whether the extruder speed EX has reached or exceeded the final extruder speed $EX_{max}$.

According to the above-described preferred embodiment, the extruder speed EX is measured by the speed sensor 9 and adjusted by the governor 7 to keep up with the demanded extruder speed EX' while the take-up speed CA is measured by the speed sensor 10 and adjusted by the governor 8 to keep up with the demanded take-up speed CA'. Thus, the apparatus can provide a high degree of speed control accuracy as far as the amount of insulating material extruded by the extruder 1 per unit time is constantly in exact proportion with the revolving speed of the motor 3, or, in other words, the revolving speed of the extruder screw.

It should, however, be recognized that the extruder 1 is required to handle various types of insulating materials and its operating characteristics can vary with the lapse of time. Taking this into consideration, it is not quite certain that the actual extrusion rate of the extruder 1 is always in good proportion with the revolving speed of the motor 3 (or of the extruder screw). In other words, there exists certain nonlinearity in the operation of the extruder 1. These points could be critical to the performance of the extruder 1 and require due consideration, especially for the startup control process in which the extruder speed is remarkably changed.

Figure 7:
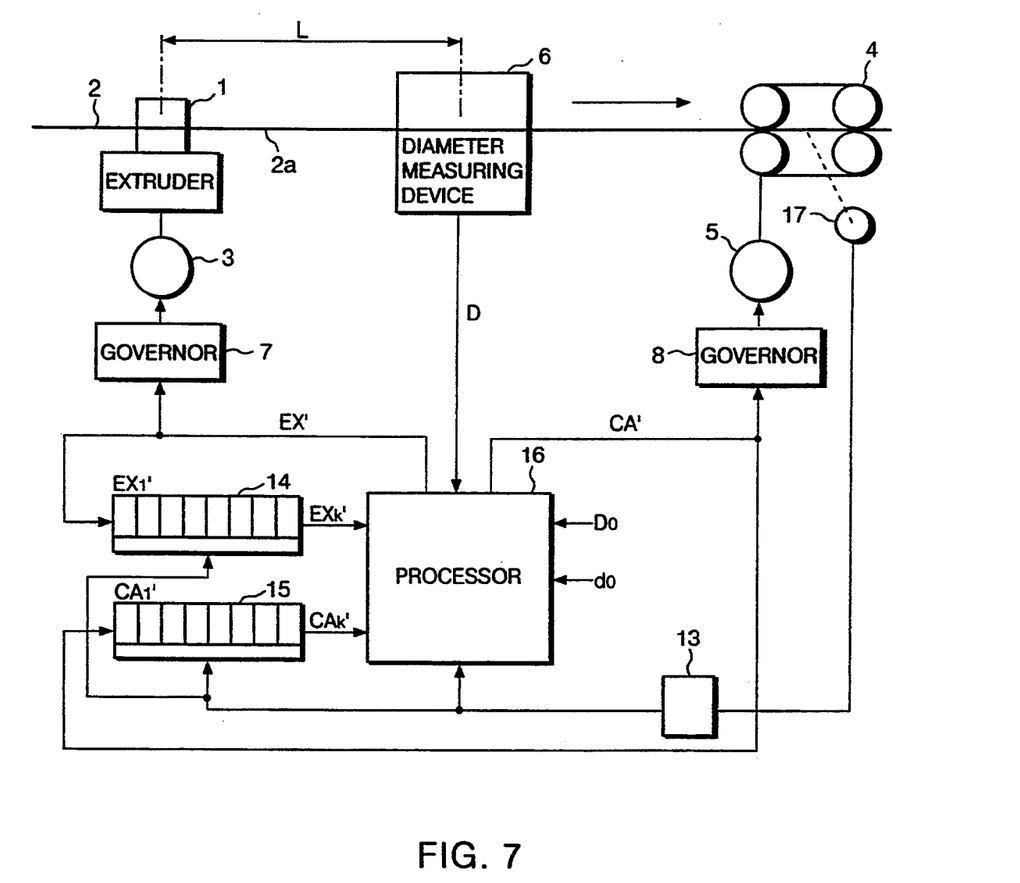
FIG. 7 is a block diagram of a startup control apparatus for controlling an outside diameter of an insulated wire according to a second embodiment of the invention.

FIG. 7 is a block diagram of a startup control apparatus for controlling an outside diameter of an insulated wire $2a$ according to a second embodiment of the invention intended to provide improvements on the aforementioned points. To summarize differences from the startup control apparatus of the first embodiment shown in FIG. 1, the apparatus of the second embodiment employs closed-loop control in which measured wire diameter D is fed back for calculating demanded extruder speed EX' and demanded take-up speed CA' as well as open-loop control in which the motors 3 and 5, extruder 1 and take-up device 4 are controlled to follow the respective speed commands.

Although the startup control apparatus of the second embodiment offers slightly lower speed control accuracy, it is more suited to practical applications compared to the apparatus of the first embodiment. This is because performance instability of the extruder 1 caused by its nonlinear operating characteristics is substantially reduced as greater weight is attached to the measured wire diameter D in controlling extruder and take-up speeds. Especially when connected to an existing wire insulating line, the startup control apparatus of the second embodiment provides consistently stable startup control performance without requiring complicated adjustment means or procedures as it relaxes the requirements associated with compatibility problems.

Now, the second embodiment is described in full detail in a step-by-step manner. In FIG. 7, members identical to those shown in FIG. 1 are designated by the same reference numerals and their detailed description is omitted in the following discussion.

In the second embodiment, demanded extruder speed EX' and demanded take-up speed CA' transmitted by the processor 16 are stored in the shift registers 14 and 15, respectively. The target speed ratio r is calculated based on demanded extruder speed $EX_k'$ and demanded take-up speed $CA_k'$ read out from the shift registers 14 and 15. The pulse generator 13 generates a pulse each time a predetermined length of the insulated wire $2a$ is taken up based on an output signal of a take-up length measuring device 17 mounted to the take-up device 4.

Figure 8:
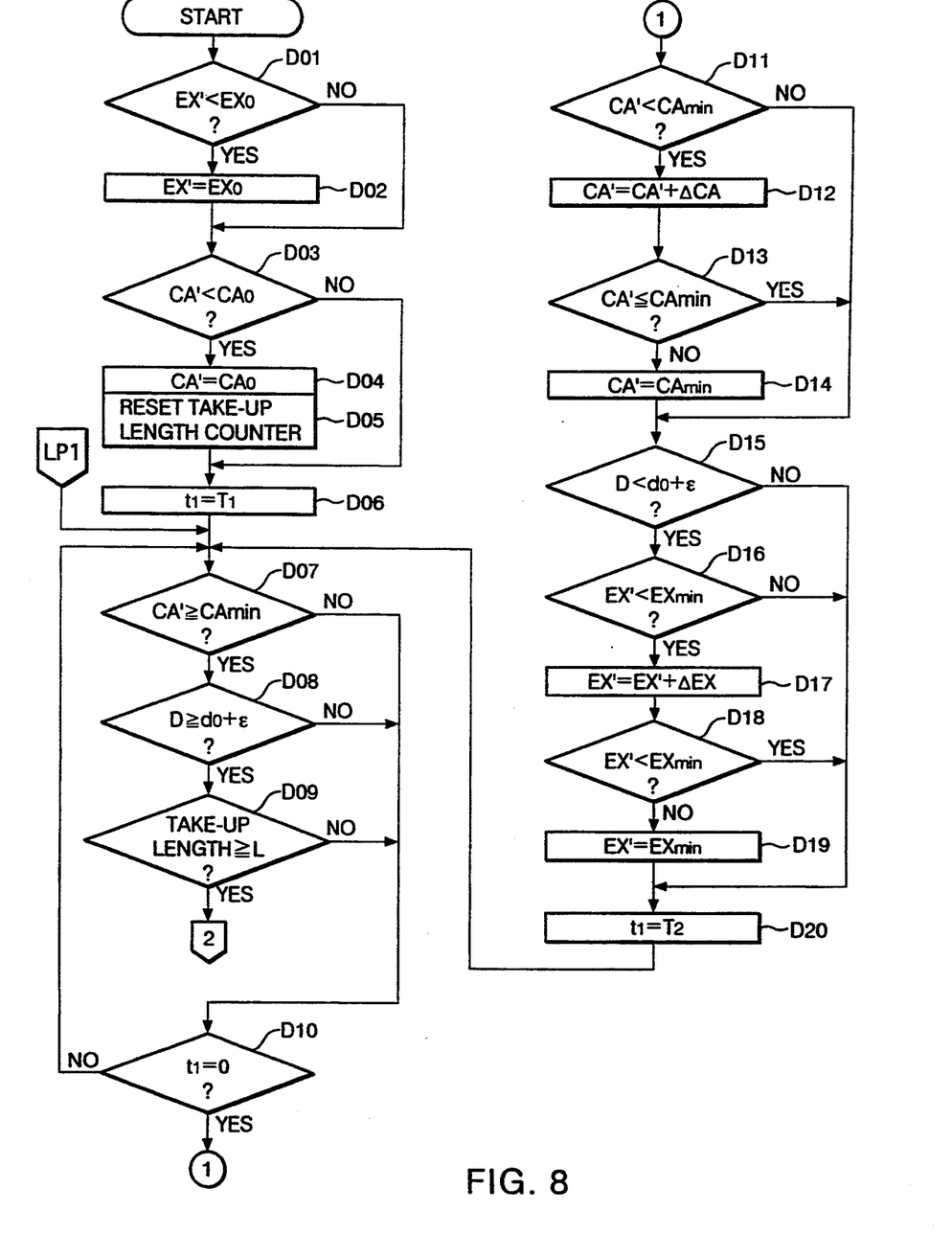
FIG. 8 is a flowchart showing preparatory operations to be performed by the apparatus of the second embodiment.
Figure 9:
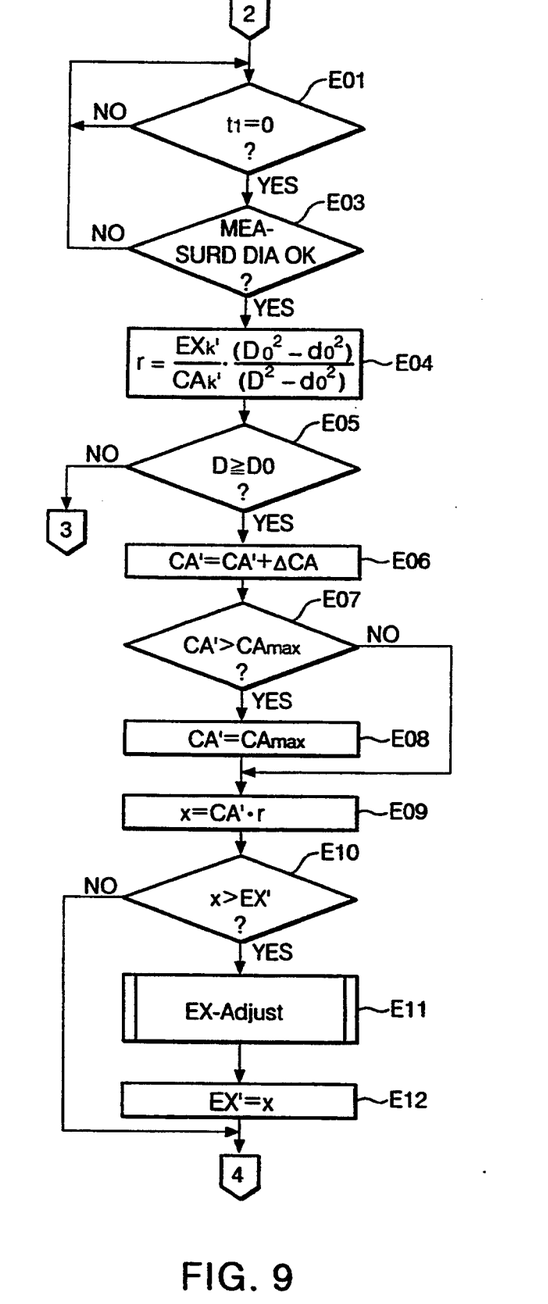
FIG. 9 is a flowchart that follows FIG. 8 showing startup control operations to be performed by the apparatus of the second embodiment.
Figure 10:
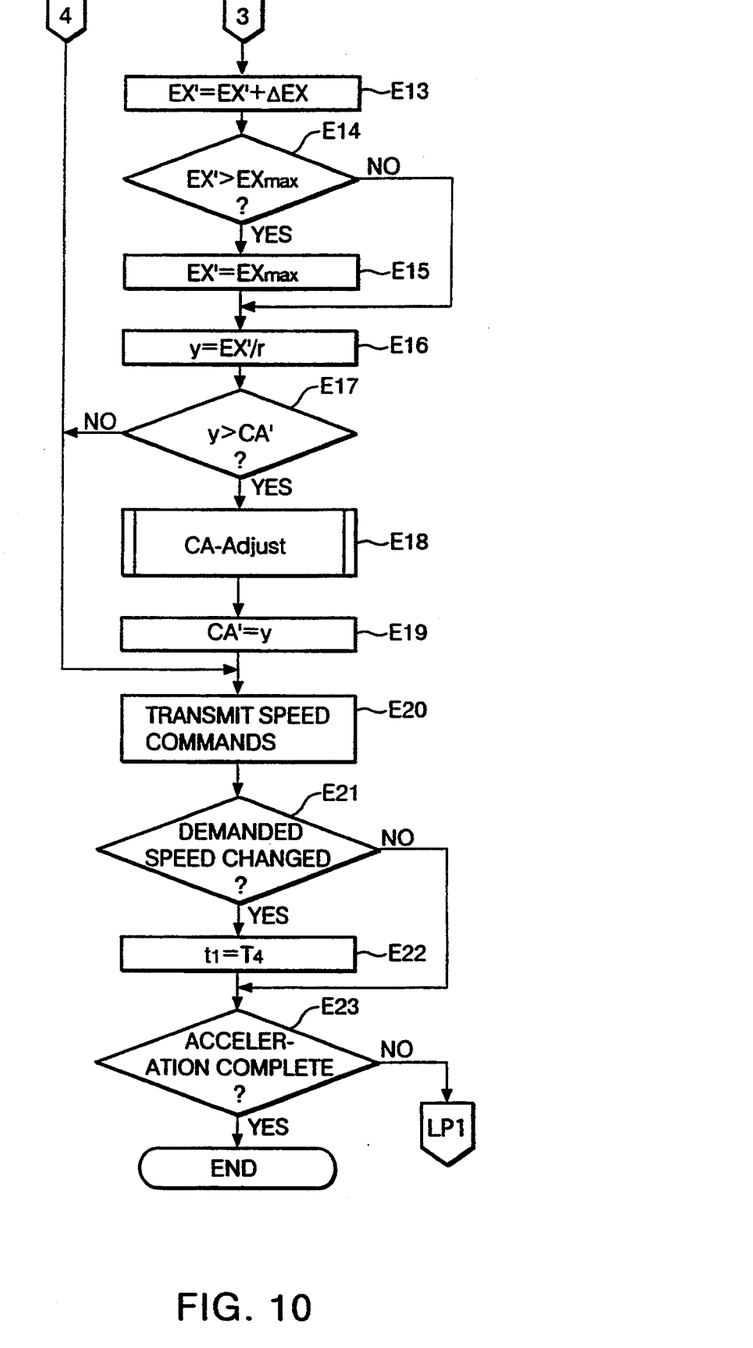
FIG. 10 is a flowchart that follows FIG. 9 showing startup control operations to be performed by the apparatus of the second embodiment.

Referring now to the flowcharts of FIGS. 8 to 10, operation of the processor 16 according to the second embodiment is described in detail.

FIG. 8 is a flowchart that corresponds to the operational sequence of the first embodiment described in FIGS. 2 and 3 showing preparatory operations to be performed in a very initial stage of the startup control process. It is to be recalled here that the apparatus of the first embodiment judges that the preparatory operations have been completed when the measured extruder speed EX (actually the revolving speed of the motor 3) and take-up speed CA (actually the revolving speed of the motor 5) have reached the predetermined values $EX_{min}$ and $CA_{min}$, respectively. What is characteristic of the second embodiment in this respect is that final judgment criteria is whether an insulating layer is certainly formed on the core conductor 2 and this judgment is made based on the measured wire diameter D although the demanded extruder speed EX' and demanded take-up speed CA' are also dealt with in the process of judgment.

To start up the extruder 1 and take-up device 4 from a completely non-operating state, the demanded extruder speed EX' and demanded take-up speed CA' are increased up to predetermined values EX0 and CA0, respectively (steps D01 through D04). The values EX0 and CA0 represent steady-state deviations or offsets existing in electrical and mechanical systems of the governors 7 and 8, motors 3 and 5, extruder 1 and take-up device 4. It follows that the extruder 1 and take-up device 4 can be started only when the demanded extruder speed EX' and demanded take-up speed CA' have been increased beyond EX0 and CA0. In step D05, the processor 16 resets an internal take-up length counter for counting pulses received from the pulse generator 13 so that the wire length taken up from the beginning can be checked in a later step D09. Then in step D06, the processor 16 sets a waiting time $T_1$ needed for stabilization of a transient state on the countdown-timer.

If the extruder 1 and take-up device 4 are already running (as they have been manually started, for example) at the beginning of the startup control process, the demanded extruder speed EX' and demanded take-up speed CA' would already have exceeded the values EX0 and CA0, respectively. In such a case (NO in steps D01 and D03), the processor 16 skips steps D02, D04 and D05 and proceeds to step D06 to reset the countdown timer.

As the processor 16 has confirmed that both the extruder 1 and take-up device 4 are in their running state in the steps up to this point, the operation flow proceeds to step D07. Steps D07, D08 and D09 are to judge whether conditions essential for proceeding to a full-scale startup control process described in FIGS. 9 and 10 have been satisfied. In step D07, the processor 16 checks operating conditions of the take-up device 4. Specifically, the processor 16 judges whether the demanded take-up speed CA' is equal to or greater than a predetermined minimum take-up speed $CA_{min}$ needed for initiating a the startup control process.

In step D08, the processor 16 checks operating conditions of the extruder 1 based on the wire insulating status instead of using the demanded extruder speed EX' as judgment criteria. This is because the extruder 1 has, as already mentioned, considerable instability in its operating performance especially in a low-speed range. Specifically, the processor 16 judges whether the measured wire diameter D is equal to or greater than the core conductor diameter $d_0$ by at least a predetermined value $\epsilon$ which ensures proper formation of an insulating layer.

In step D09, the processor 16 judges whether the length of the insulated wire $2a$ taken up from the beginning has reached or exceeded the distance L between the extruder 1 and diameter measuring device 6. More specifically, it is judged whether demanded extruder speeds EX' and demanded take-up speeds CA' have been shifted all the way through consecutive storage locations in the shift registers 14 and 15 until the processor 16 can read out values $EX_k'$ and $CA_k'$ required for calculating target speed ratio r as will be described later.

The processor 16 proceeds to the flowchart of FIG. 9 to initiate a full-scale startup control process as soon as all the conditions shown in steps D07 through D09 have been satisfied. If any of these conditions is not satisfied, the processor 16 proceeds to step D11 and onward after the countdowntimer has completed the counting of the waiting time $T_1$ (YES in step D10).

Detailed explanation of steps D11 through D14 is omitted because these steps are substantially same as steps A05 through A08 of FIG. 2 already described with reference to the first embodiment except that judgments here are made based on the demanded take-up speed CA' rather than the measured take-up speed CA.

Step D15 is to judge whether the measured wire diameter D is less than the sum of the core conductor diameter $d_0$ and the predetermined value $\epsilon$ (i.e., $D < d_0 + \epsilon$). If the judgment result is in the affirmative (YES in step D15), the processor 16 increases the demanded extruder speed EX' in steps D16 through D19. Explanation of these steps is omitted here because they are substantially same as steps A11 through A14 of FIG. 3.

After increasing the demanded extruder speed EX', the processor 16 sets a waiting time $T_2$ needed for stabilization of a transient state oh the countdowntimer (step D20) and performs again the judgments of steps D07 through D09. When all these conditions have been eventually satisfied, the processor 16 proceeds to step E01 of FIG. 9.

The full-scale startup control process illustrated in steps E01 through E23 of FIGS. 9 and 10 differs from that of the first embodiment not only in the controlled parameters but also in that the demanded extruder speed EX' and demanded take-up speed CA' are returned to the processor 16 to accomplish a feedback loop (steps E04, E10 and E17). Except for these points, however, the apparatus of the second embodiment takes an operation flow very similar to that of the first embodiment. There is not provided a step-by-step description of the operation flow shown in FIGS. 9 and 10 as the foregoing description of steps B01 through B23 in FIGS. 4 and 5 is applicable. It is to be noted, however, that FIG. 9 does not contain "step E02" which should correspond to step B02 of FIG. 4. This is because the same operation as step B02 is already finished in step D08 of FIG. 8. Also, "EX-Adjust" and "CA-Adjust" subroutines to be called from steps E11 and E18, respectively, are not separately shown for the second embodiment. This is because these subroutines are exactly the same as shown in FIGS. 6(1)–6(2) for the first embodiment.

According to the second embodiment, if the processor 16 judges in the last step of FIG. 10 that the line acceleration process is incomplete (NO in step E23), the operation flow is returned to LP1 in FIG. 8 to repeat judgments of steps D07 through D09. What is critical in this case is the judgment in step D08. If the judgment result in this step is in the affirmative (YES in step D08), the processor 16 may proceed to further steps to complete the process. However, if the judgment result is in the negative (NO in step D08) even when the demanded take-up speed CA' and demanded extruder speed EX' are sufficiently high, the extruder 1 is suspected to be faulty or running short of the supply of insulating material, for example. Moreover, this will result in difficulty in calculating target speed ratio r in step E04 of FIG. 9. To cope with this kind of problem, the processor 16 detects an occurrence of such situation and thereby transmits commands to produce audible and/or visual warnings and interrupt the process of such unstable startup control operations.

In either of the above-described preferred embodiments, there is provided a sequence of preparatory operations to be performed by the startup control apparatus before proceeding to the full-scale startup control process in which the demanded extruder speed EX' and demanded take-up speed CA' are increased in a step-by-step manner through the first and second correction cycles. In a varied form of the invention, the apparatus may be constructed in such a way that the preparatory operations are manually performed by operating personnel.

What is claimed is:

1. A method of controlling a startup process of a wire insulating line wherein extruder means supplies an insulating material around a core including at least one conductor, take-up means takes up an insulated wire, diameter measuring means measures an outside diameter of the insulated wire, processor means calculates demanded extruder and take-up speeds and transmits them to said extruder and take-up means, whereby said extruder and take-up means are accelerated until a predetermined outside diameter $D_0$ of the insulated wire is obtained, said method comprising:

a first step wherein said processor means acquires data on a wire diameter D at an outlet of said extruder means measured by said diameter measuring means as well as a demanded extruder speed $EX_k'$ and a demanded take-up speed $CA_k'$ sampled at the same time when that portion of the insulated wire having the diameter D was passing through the outlet of said extruder means, calculates a target speed ratio r, which gives an extruder to take-up speed ratio to be achieved, by substituting the above data as well as the predetermined wire diameter $D_0$ and a known diameter $d_0$ of the core conductor into the equation $$r = \frac{EX_k'}{CA_k'} \cdot \frac{(D_0^2 - d_0^2)}{(D^2 - d_0^2)}$$

and then compares the measured wire diameter D with the target wire diameter $D_0$;

a second step wherein said processor means performs a first correction in which a demanded take-up speed CA' is increased by a predetermined first take-up speed increment $\Delta CA$ if the measured wire diameter D is judged to be equal to or greater than the target wire diameter $D_0$ in said first step;

a third step wherein said processor means calculates a target extruder speed x from the target speed ratio r obtained in said first step and the demanded take-up speed CA' updated in said second step using the equation $$x = CA' \cdot r$$

and then compares the target extruder speed x with a demanded extruder speed EX';

a fourth step wherein, if the target extruder speed x is judged to be greater than the demanded extruder speed EX' in said third step, said processor means adds a predetermined second extruder speed increment $\Delta E_{max}$ to the demanded extruder speed EX' and performs a second correction in which
if the increased value of the demanded extruder speed $EX' + \Delta E_{max}$ is less than the target extruder speed x, the demanded extruder speed EX' is replaced by the value $EX' + \Delta E_{max}$ and the demanded take-up speed CA' is replaced by a value obtained by dividing the increased value of the demanded extruder speed $EX' + \Delta E_{max}$ ($=x$) by the target speed ratio r obtained in said first step; and if the increased value of the demanded extruder speed $EX' + \Delta E_{max}$ is equal to or greater than the target extruder speed x, the demanded extruder speed $EX'$ is replaced by the target extruder speed x;

a fifth step wherein said processor means retains the demanded extruder speed $EX'$ as it is if the target extruder speed x is judged to be equal to or less than the demanded extruder speed $EX'$ in said third step;

a sixth step wherein said processor means performs a first correction in which the demanded extruder speed $EX'$ is increased by a predetermined first extruder speed increment $\Delta EX$ if the measured wire diameter D is judged to be less than the target wire diameter $D_0$ in said first step;

a seventh step wherein said processor means calculates a target take-up speed y from the target speed ratio r obtained in said first step and the demanded extruder speed $EX'$ updated in said sixth step using the equation $$y = EX'/r$$

and then compares the target take-up speed y with the demanded take-up speed $CA'$;

an eighth step wherein, if the target take-up speed y is judged to be greater than the demanded take-up speed $CA'$ in said seventh step, said processor means adds a predetermined second take-up speed increment $\Delta C_{max}$ to the demanded take-up speed $CA'$ and performs a second correction in which if the increased value of the demanded take-up speed $CA' + \Delta C_{max}$ is less than the target take-up speed y, the demanded take-up speed $CA'$ is replaced by the value $CA' + \Delta C_{max}$ and the demanded extruder speed $EX'$ is replaced by a value obtained by multiplying the increased value of the demanded take-up speed $CA' + \Delta C_{max}$ ($=y$) by the target speed ratio r obtained in said first step; and if the increased value of the demanded take-up speed $CA' + \Delta C_{max}$ is equal to or greater than the target take-up speed y, the demanded take-up speed $CA'$ is replaced by the target take-up speed y;

a ninth step wherein said processor means retains the demanded take-up speed $CA'$ as it is if the target take-up speed y is judged to be equal to or less than the demanded take-up speed $CA'$ in said seventh step;

a tenth step wherein said processor means transmits the demanded extruder speed $EX'$ and demanded take-up speed $CA'$ obtained when said fourth, fifth, eighth or ninth step has been completed to said extruder means and take-up means, respectively; and wherein, if the demanded extruder speed $EX'$ or demanded take-up speed $CA'$, whichever preselected, is less than a set final speed, said processor means repeats the foregoing steps and completes the above-described startup process when the set final speed is achieved.

2. A method according to claim 1 wherein if the demanded take-up speed $CA'$ updated in said second step is greater than a set final take-up speed $CA_{max}$, the demanded take-up speed $CA'$ is replaced by the set final take-up speed $CA_{max}$; and if the demanded extruder speed $EX'$ updated in said sixth step is greater than a set final extruder speed $EX_{max}$, the demanded extruder speed $EX'$ is replaced by the set final extruder speed $EX_{max}$.

3. A method according to claim 1 wherein if the target extruder speed x is greater than a set final extruder speed $EX_{max}$ in said fourth step, the target extruder speed x is replaced by the set final extruder speed $EX_{max}$ and the demanded take-up speed $CA'$ is replaced by a value obtained by dividing the final extruder speed $EX_{max}$ by the target speed ratio r obtained in said first step; and if the target take-up speed y is greater than a set final take-up speed $CA_{max}$ in said eighth step, the target take-up speed y is replaced by the set final take-up speed $CA_{max}$ and the demanded extruder speed $EX'$ is replaced by a value obtained by multiplying the final take-up speed $CA_{max}$ by the target speed ratio r obtained in said first step.

4. A method according to claim 1 further comprising an eleventh step to follow said tenth step wherein said processor means judges whether the demanded extruder speed $EX'$ or demanded take-up speed $CA'$ has changed from their previous values which were transmitted to said extruder means and take-up means and, if either of them has changed, said processor means introduces a waiting time to cause a certain delay in taking further actions.

5. A method according to claim 1 wherein said diameter measuring means is located at a specified distance L from the outlet of said extruder means, and said processor means, additionally provided with sample-and-hold means for sampling and holding the demanded extruder speed $EX'$ and demanded take-up speed $CA'$ each time said take-up means takes up a specified length of the insulated wire, acquires data on the measured wire diameter D from said diameter measuring means and reads out the demanded extruder speed $EX_k'$ and demanded take-up speed $CA_k'$ sampled when that portion of the insulated wire having the diameter D was located at distance L upstream from said diameter measuring means, and calculates the target speed ratio r from the above data as well as the predetermined wire diameter $D_0$ and known diameter $d_0$ of the core conductor.

6. A method according to claim 1 wherein, prior to the calculation of the target speed ratio r, said processor means judges whether the measured wire diameter D is greater than the diameter $d_0$ of the core conductor by at least a predetermined value $\epsilon$ and, if the judgment result is in the affirmative, said processor means proceeds to further steps, but if the judgment result is in the negative, said processor means interrupts the startup control process.

7. A method of controlling a startup process of a wire insulating line wherein extruder means supplies an insulating material around a core including at least one conductor, take-up means takes up an insulated wire, diameter measuring means measures an outside diameter of the insulated wire, processor means calculates demanded extruder and take-up speeds and transmits them to said extruder and take-up means, whereby said extruder and take-up means are accelerated until a predetermined outside diameter $D_0$ of the insulated wire is obtained, said method comprising:

a first step wherein said processor means acquires data on a wire diameter D at an outlet of said extruder means measured by said diameter measuring means as well as an extruder speed $EX_k$ and a take-up speed $CA_k$ sampled at the same time when that portion of the insulated wire having the diameter D was passing through the outlet of said extruder means, calculates a target speed ratio r, which gives an extruder to take-up speed ratio to be achieved, by substituting the above data as well as the predetermined wire diameter $D_0$ and a known diameter $d_0$ of the core conductor into the equation $$r = \frac{EX_k}{CA_k} \cdot \frac{(D_0^2 - d_0^2)}{(D^2 - d_0^2)}$$

and then compares the measured wire diameter D with the target wire diameter $D_0$;

a second step wherein said processor means performs a first correction in which a demanded take-up speed CA' is increased by a predetermined first take-up speed increment $\Delta CA$ if the measured wire diameter D is judged to be equal to or greater than the target wire diameter $D_0$ in said first step;

a third step wherein said processor means calculates a target extruder speed x from the target speed ratio r obtained in said first step and the demanded take-up speed CA' updated in said second step using the equation $$x = CA' \cdot r$$

and then compares the target extruder speed x with an extruder speed EX;

a fourth step wherein, if the target extruder speed x is judged to be greater than the extruder speed EX in said third step, said processor means adds a predetermined second extruder speed increment $\Delta E_{max}$ to the demanded extruder speed EX' and performs a second correction in which if the increased value of the demanded extruder speed $EX' + \Delta E_{max}$ is less than the target extruder speed x, the demanded extruder speed EX' is replaced by the value $EX' + \Delta E_{max}$ and the demanded take-up speed CA' is replaced by a value obtained by dividing the increased value of the demanded extruder speed $EX' + \Delta E_{max}$ (=x) by the target speed ratio r obtained in said first step; and if the increased value of the demanded extruder speed $EX' + \Delta E_{max}$ is equal to or greater than the target extruder speed x, the demanded extruder speed EX' is replaced by the target extruder speed x;

a fifth step wherein said processor means retains the demanded extruder speed EX' as it is if the target extruder speed x is judged to be equal to or less than the extruder speed EX in said third step;

a sixth step wherein said processor means performs a first correction in which the demanded extruder speed EX' is increased by a predetermined first extruder speed increment $\Delta EX$ if the measured wire diameter D is judged to be less than the target wire diameter $D_0$ in said first step;

a seventh step wherein said processor means calculates a target take-up speed y from the target speed ratio r obtained in said first step and the demanded extruder speed EX' updated in said sixth step using the equation $$y = EX'/r$$

and then compares the target take-up speed y with the take-up speed CA;

an eighth step wherein, if the target take-up speed y is judged to be greater than the take-up speed CA in said seventh step, said processor means adds a predetermined second take-up speed increment $\Delta C_{max}$ to the demanded take-up speed CA' and performs a second correction in which if the increased value of the demanded take-up speed $CA' + \Delta C_{max}$ is less than the target take-up speed y, the demanded take-up speed CA' is replaced by the value $CA' + \Delta C_{max}$ and the demanded extruder speed EX' is replaced by a value obtained by multiplying the increased value of the demanded take-up speed $CA' + \Delta C_{max}$ (=y) by the target speed ratio r obtained in said first step; and if the increased value of the demanded take-up speed $CA' + \Delta C_{max}$ is equal to or greater than the target take-up speed y, the demanded take-up speed CA' is replaced by the target take-up speed y;

a ninth step wherein said processor means retains the demanded take-up speed CA' as it is if the target take-up speed y is judged to be equal to or less than the take-up speed CA in said seventh step;

a tenth step wherein said processor means transmits the demanded extruder speed EX' and demanded take-up speed CA' obtained when said fourth, fifth, eighth or ninth step has been completed to said extruder means and take-up means, respectively; and wherein, if the extruder speed EX or take-up speed CA, whichever pre-selected, is less than a set final speed, said processor means repeats the foregoing steps and completes the above-described startup process when the set final speed is achieved.

* * * * *